United States Patent [19]
Eker

[11] 3,923,130
[45] Dec. 2, 1975

[54] HYDRODYNAMIC BRAKING DEVICE

[75] Inventor: Erik Per-Olof Eker, Goteborg, Sweden

[73] Assignee: AB Volvo, Goteborg, Sweden

[22] Filed: May 13, 1974

[21] Appl. No.: 469,681

[30] Foreign Application Priority Data
May 15, 1973 Sweden.............................. 73068595

[52] U.S. Cl................ 192/12 A; 192/4 B; 188/291; 188/296
[51] Int. Cl.²...................... B60K 41/24; F16D 57/02
[58] Field of Search................ 192/4 B, 12 A, 13 R; 188/291, 290, 296

[56] References Cited
UNITED STATES PATENTS

| | | | |
|---|---|---|---|
| 2,827,989 | 3/1958 | Christenson | 192/12 A X |
| 2,894,609 | 7/1959 | Tattersall | 192/13 R X |
| 3,029,902 | 4/1962 | Jarvis | 192/12 A X |
| 3,179,217 | 4/1965 | Root | 192/13 R |
| 3,722,643 | 3/1973 | Kempf et al. | 192/13 R |
| 3,749,209 | 7/1973 | Weinrich et al. | 192/12 A X |
| 3,777,860 | 12/1973 | Forster et al. | 192/12 A X |

Primary Examiner—Samuel Scott
Assistant Examiner—Lance W. Chandler
Attorney, Agent, or Firm—Young & Thompson

[57] ABSTRACT

A hydrodynamic braking device for motor vehicles comprising a rotor which is rotatably mounted in a stator frame. The rotor is driven at the speed of the motor crankshaft by means of a hollow shaft which connects the rotor with the driving member of the clutch and which is arranged concentrically with the egress shaft of the driven member of the clutch.

2 Claims, 1 Drawing Figure

U.S. Patent  Dec. 2, 1975  3,923,130
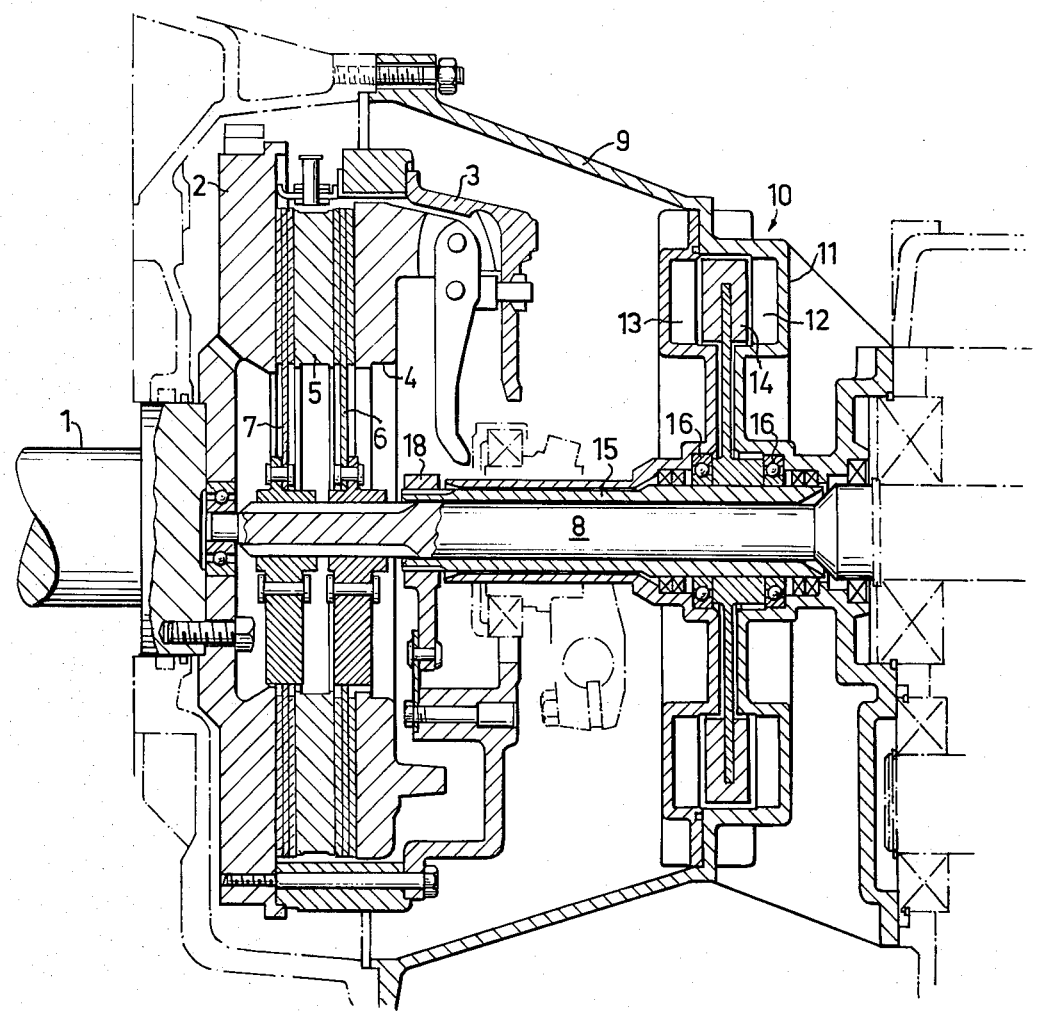

HYDRODYNAMIC BRAKING DEVICE

The present invention concerns a hydrodynamic braking device for motor vehicles comprising a rotor, rotatably mounted in a stator frame, said rotor being operatively connected to the vehicle transmission, which includes a clutch situated between the motor and the gear box.

The arrangement of hydrodynamic braking devices between the gear box and the vehicle rear axle or in direct connection to the rear axle is previously known. In such installations the rotor is driven at the rotational speed of the gear box egress shaft or at a rate proportional to the rotational speed. One advantage of this arrangement is that the braking device can easily be designed as a separate, supplementary unit which can be installed as required without extensive reconstruction of the motor or transmission of the vehicle. An important disadvantage, however, is that the various gear stages of the gear box cannot be utilized to increase the rotational speed of the rotor as the speed of the vehicle decreases. This implies that the braking effect is low at low vehicle speeds since the greatest braking torque is obtained when the difference between the speed of the stator and the speed of the rotor is greatest.

The direct driving of the rotor by the motor crankshaft is also known and implies that the motor must be specially constructed for this purpose. The above-mentioned disadvantages are indeed eliminated through use of such a measure, but at the expense of loss of flexibility which was present in the first-named arrangement since the braking device cannot be designed as an attachment. This solution is therefore extremely costly.

The purpose of the present invention is to effect a hydrodynamic braking device which combines the advantages of the devices described above, avoiding the disadvantages mentioned. More precisely, a braking device will be effected which can be designed as an attachment to already existing motors and with which the gear box gear stages can be utilized to increase the rotary speed of the rotor when the vehicle speed decreases.

This is achieved according to the invention by coupling the rotor to the clutch driving member by means of a hollow shaft which is arranged concentrically with the driven member of the clutch. In this way a braking device, external to the motor and directly driven by the motor crankshaft, is effected. Because the rotor is, in this way, separated from the egress shaft of the driven member of the clutch (the ingress shaft of the gear box), no increased mass on this shaft is obtained, which otherwise would result in increased load and thereby increased wear on the gear box synchronizer rings when the rings brake and accelerate the shaft during up and down shifting.

The braking device is shown in greater detail in the attached drawing, where the FIGURE shows a clutch case in section with a disc clutch and a hydrodynamic braking device.

The numeral 1 denotes the crankshaft end of a motor which is not shown in greater detail. Crankshaft end 1 supports a flywheel and a conventional disc clutch comprising a clutch housing 3 connected to the flywheel 2, pressure plates 4,5 and discs 6,7. The latter are non-rotatably connected by means of splines with the ingress shaft 8 to a gear box which is not more closely shown. A clutch case 9 encloses the parts described A hydrodynamic braking device, generally indicated by 10, is actively connected to the crankshaft end 1. The braking device 10 comprises a stator frame 11 formed as a single piece with the motor clutch case, said stator frame containing two sets of stator blades 12,13. Within the stator frame 11 is a rotor 14 which is non-rotatably attached to a hollow shaft 15. Said shaft is arranged concentrically with the gear box ingress shaft 8 and is rotatably mounted in ball bearings 16. The hollow shaft 15 is non-rotatably connected, by means of splines, to a driver member 18 which is in turn rigidly connected to the clutch housing 3. A rigid connection between the crankshaft 1 and the rotor 14 is obtained by means of the arrangement described so that the rotor 14 is driven at the same speed as the crankshaft 1. Because the rotor is wholly separated from the gear box ingress shaft 8, gear changes take place with no influence whatever by the rotor 14, which implies that the synchronizer rings are not subjected to additional stress.

Filling and draining of hydraulic fluid in the stator frame 11 takes place by means of, per se, known and not more closely shown arrangements. Through variation of the amount of hydraulic fluid in the frame, a variety of braking effects can be obtained.

By means of the invention a braking device is obtained which can easily be designed as a module in a system of a plurality of attachments.

What I claim is:

1. A hydrodynamic braking device for motor vehicles having an engine crank shaft and a clutch and a gear box driven by a drive pinion which in turn is driven by the driven member of the clutch, the driving member of the clutch being secured to the engine crank shaft, said braking device comprising a stator frame and a rotor, said rotor being rotatably mounted in the stator frame and being secured to a hollow shaft which is mounted concentrically with said drive pinion and which is secured to the driving member of the clutch, the hollow shaft securing the rotor for rotation with the driving member of the clutch.

2. A braking device as claimed in claim 1, in which the stator frame forms a part of the motor clutch case.

* * * * *